Figure 1:
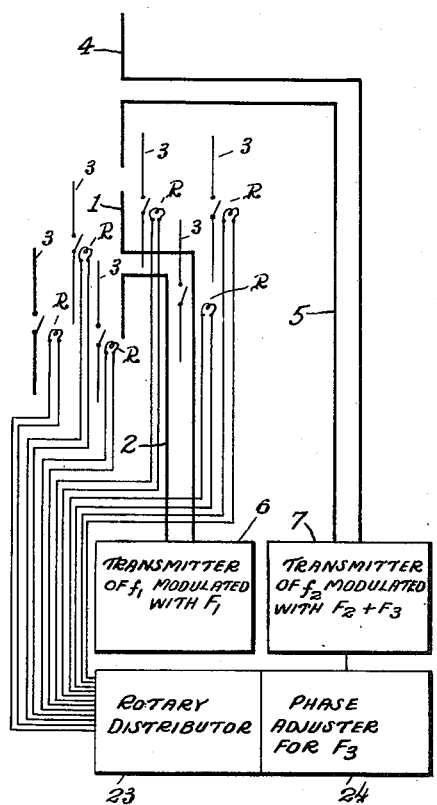

Aug. 6, 1940.  H. G. BUSIGNIES  2,210,651
RADIO BEACON SYSTEM
Filed April 3, 1937

INVENTOR
HENRI GASTON BUSIGNIES
BY
ATTORNEY

Patented Aug. 6, 1940

2,210,651

UNITED STATES PATENT OFFICE 2,210,651

RADIO BEACON SYSTEM

Henri Gaston Busignies, Paris, France, assignor to International Standard Electric Corporation, New York, N. Y.

Application April 3, 1937, Serial No. 134,764
In France April 10, 1936

5 Claims. (Cl. 250—11)

The present invention relates to improvements in radio signalling systems and more particularly relates to the transmission of radio signals by means of directional transmitters whose preferential direction of propagation is angularly displaced in a substantially uniform manner, such as radio beacons, and which permits a moving vehicle provided with a suitable receiving apparatus to determine its angular position with respect to the radio beacon from which it is receiving the radio transmissions.

The usual procedure for determinations of this character is at present as follows:

The transmitter of a radio beacon is provided with a system of directional aerials whose high frequency constants are combined so that the directional diagram rotates in the space around the radio beacon at the speed of a half or one or two revolutions per minute.

At the receiving station the operator who wishes to know the angle made by the direction passing through the radio beacon with the geographic north, observes variations of intensity of reception and it is easily possible for him to observe a maximum or a minimum of intensity.

Moreover, when the predetermined portion of the directional diagram, that is to say that corresponding to the maximum or minimum of intensity of emission, passes through the geographic north, the radio beacon emits a characteristic signal.

The operator, knowing the speed of rotation of the diagram (generally one revolution per minute) starts a chronometer when he hears this characteristic signal "north" and stops the chronometer when he hears the directional characteristic of the rotating diagram, that is to say, at the moment of the maximum or minimum of reception. The hand of the chronometer then makes with its starting position an angle which is the angle sought. Various improvements have been made in this method in order to make it more practicable and in particular special chronometers have been developed, which in the case of minima, permit a mean to be automatically taken.

This method, which has the advantage of permitting a measurement of direction by means of an ordinary receiver, nevertheless has many disadvantages. In particular, the intervention of the operator is indispensable and the personal element is apt to interfere with the observation. Moreover, the taking of each measurement extends over a relatively long period and if readings have to be made often the work becomes tedious. Finally, with very fast moving aeroplanes such as war planes, the aeroplane and the receiving apparatus travels a substantial distance in the course of the time of the taking of the measurement, and there is a resulting source of error which forms an objection to the use of this method.

The present invention enables the limitations, objections and causes of error peculiar to the usual method described to be avoided, and further has this important characteristic that unauthorised receiving apparatus not provided with the devices according to the invention cannot obtain any useful indication for the requirements of navigation from the radio beacons.

The invention and its methods of realisation will be understood after reading the following description:

In accordance with one of the features of the invention, the rotating directional diagram of the radio beacon instead of rotating at the speed of one revolution per minute, will turn at a determined speed, for example of 10 to 20 revolutions per second.

The directional transmitter, the directional pattern of which rotates 10 to 20 times per second as mentioned above, will operate at a frequency $f_1$ which will be modulated at a lower frequency $F_1$ situated for example in the range of audio frequencies.

A second radio transmitter of power substantially equal to the first, but employing a nondirectional aerial, radiates a carrier frequency $f_2$ modulated at a lower frequency $F_2$. The frequency $f_2$ differs from the frequency $f_1$ by a quantity more or less, such that no beat is produced having a frequency near the frequency $F_1$ or the frequency $F_2$. The second transmitter is also modulated at a very low frequency $F_3$, such as 10 to 20 periods per second, which frequency must be equal to the speed of rotation of the directional diagram of the radio beacon, and which must be synchronised with this frequency of rotation.

On the aeroplanes or other vehicles which have to utilise the transmissions of such a radio beacon, the usual receiving apparatus must be augmented by the following equipment.

(1) two low frequency filters adapted to separate the modulation frequencies $F_1$ and $F_2$ from the two transmitters;

(2) two detectors permitting, in accordance with well-known methods, the indication of the envelopes of the two waves. These envelopes represent amplitude variations at a rate of 10 to 20 periods per second and result from different causes respectively in the cases of the two different waves, the one drawn from the frequency whose carrier is $f_1$ and whose tone modulation is $F_1$ proceeding, from the fact that the directional diagram of the radio beacon rotates at frequency $F_3$, and the other (which is derived from the carrier $f_2$ tone modulated with frequency $F_2$), proceeding from the actual modulation of this frequency by frequency $F_3$;

(3) any phase meter device (or any other arrangement sensitive to a phase difference) which is able to measure phase angles reaching 360°, and will give the difference of phase between these two currents of 10 to 20 periods per second.

It should be noted that the apparent 10 to 20 cycle modulation of the carrier of frequency $f_1$ will have a phase dependent upon the position of the receiver with respect to the transmitter. This is because the maximum amplitude will be heard in the receiver at the moment when the diagram is directed toward this receiver, and thus the position in time of the peaks or maxima of the received signals of frequency $f_1$ will depend not only upon the phase of the rotation of the radiation diagram with respect to some axis of reference such as north, but also upon the direction of the line joining the transmitter with the receiver.

For example, if the rotating radiation pattern passes through the north direction at a predetermined instant of reference, the phase of the apparent sub-audible modulations as perceived by a receiver directly north of the transmitter will be zero with respect to this instant of reference. In other words, the peaks of the apparent amplitude variations will occur at the given instant of reference and then a tenth or a twentieth of a second later, etc. If the receiver is located directly east of the transmitter and the direction of rotation is assumed to be clockwise, the phase of the apparent sub-audible modulation of frequency $F_3$ will be 90° lagging with respect to the assumed instant of reference. In other words, the peaks of the apparent amplitude variations will occur a quarter of a cycle later than the assumed instant of reference and then a tenth or a twentieth of a second thereafter, etc. The actual sub-audible modulations of the carrier $f_2$ at frequency $F_3$ serve as a standard of reference with which the phase of the apparent sub-audible modulations of the rotating diagram may be compared.

The tone frequency modulations $F_1$ and $F_2$ have been ignored in the above explanation. These tone frequency modulations permit the carriers $f_1$ and $f_2$ to be readily separated after the preliminary detection in the usual receiving apparatus.

If the receiver is calibrated to give a zero reading for a given reference direction such as north, the angle of phase indicated by phasemeter 14, therefore, directly represents the angle formed by the line joining the receiver at the radio beacon with the direction of the north.

In order that the required amount of displacement of the phasemeter calibration needed to give such a direct representation may be zero it is sufficient to adjust the phase of the frequency $F_3$ at the non-directional transmitter so that the axis of the maxima of the rotating diagram of transmission passes in the "north" direction at the same time that the wave of frequency $F_3$ is at its maxima intensity. Under these conditions, the receiving phase meter without any displacement of its calibration would indicate an angle 0 if the receiver were placed in the direction of the "north" with respect to the radio beacon.

The indications of the phase meter on its dial, keeping into account the direction of rotation of the radio beacon, are assumed to be arranged so that the angles indicated increase when the receiver is moved clockwise around the radio beacon. If desired the reverse direction could be adopted.

An interesting feature of the invention is that secrecy may be ensured owing to the fact that the constant of displacement of the calibration may be modified as desired, either in accordance with a method of operation agreed upon in advance and known only to the interested parties, or in an arbitrary manner which will be communicated to them from time to time either by radio signals coded on their apparatus or at the home port. In this way an apparatus, even equipped with a receiver comprising the additional elements mentioned above, could not employ the radio beacon unless it knew the values of the calibration displacement of the radio beacon or beacons concerned at the time. The calibration of the receiver may be adjustably displaced by means well known per se such as a phase shifter in one of the receiver channels or a movable scale or pointer on the phasemeter.

The two transmitters, that is the radio beacon and the non-directional transmitter, are not necessarily placed on the same spot, but may be spaced a certain distance apart. However, this distance must not be too great, otherwise differences of phase between the waves of 10 to 20 periods per second determined by the rotating emission of the radio beacon on the one hand, and by the modulation of the non-directional transmitter on the other hand, would occur and lead to incorrect observations. Thus for the case of a frequency of 20 periods per second a distance of 400 kilometres can, if the receiving station be placed in the vicinity of the line joining the two transmitting stations, cause a real error of the phase angle which may reach 10°. It may also be well for the two transmitters to be placed near each other for various other reasons, one of which is that the long distance reception of the two transmitters may be as identical as possible, and another, that synchronisation between the revolutions of the directional aerial system and the very low frequency modulation $F_3$ of the non-directional transmitter be facilitated. The modulation may be effected by any means known in the art.

It is also an advantage for the directional system and the non-directional system to be so arranged that their diagram of radiation in a vertical plane may be the same for the two transmitters, and moreover that they transmit powers of the same order. The carrier frequencies of the two transmitters may be maintained constant in any manner, for example, by quartz control, and such frequencies should differ by an amount sufficiently high to prevent beats of audio frequency, that is to say, near the frequencies $F_1$ or $F_2$, but not by an amount so great that the two carrier waves cannot be contained in the pass-band of reception of the receiver. When ultrashort waves are employed, these two carrier frequencies may even be supplied by the same transmitting equipment, at the output of which they will each be directed to their respective aerial by means of suitable filter circuits.

In the case of ultra-short waves the frequencies $F_1$ and $F_2$ may be inaudible on account of the wide frequency band available with such waves.

In the case in which the difference between the carrier frequencies is great, it would obviously be possible to employ two separate receivers in order to receive them so as to avoid the necessity of providing a receiver with a very wide pass-band. This would be the case for long waves.

For the case in which the directional diagram has the form of a figure of eight with two symmetrical loops with respect to the origin, the low frequency $F_3$ which is employed for the second modulation of the non-directional transmitter should no longer be equal to the number of revolutions per second of the diagram of the directional aerial, but to double this number. In any case, there would be an ambiguity of 180° for the indication of the phase meter.

The directional aerial employed may be of any desired type. In particular, it is possible to employ two couples of mutually perpendicular doublets connected to two fixed mutually perpendicular windings in which a movable winding rotating at the desired speed for the diagram, induces a high frequency current whose composition in the two couples ensures the suitable rotation of the diagram. It is also possible, however, for the system to be composed of an axial vertical antenna surrounded by a certain number of other vertical antennae each divided into two parts and all regularly arranged around the first at the same distance, so as to be regularly distributed over the surface of a cylinder having as axis the first antenna. The distance of two consecutive peripheral antennae would preferably equal to quarter the wavelength. Each of the peripheral vertical antennae constitutes a doublet which is actuated at a given moment by connecting together two portions of the peripheral antenna by means of an electro-magnetic relay which is actuated by means of a distributor arm which rotates at the speed at which the diagram of the transmitter itself should rotate.

With such a system, which is very easily carried out, the diagram no longer rotates in a uniform manner but jumps abruptly from a quantity equal to the angle formed by two consecutive peripheral antennae. The diagram of the intensity of reception by function of time at any point, then does not present the aspect of a regular curve with symmetrically rising and descending portions, but rather the shape of a double staircase. However, in view of the integration effect which is produced in the phase meter, the error resulting from this intermittent rotary movement is reduced so as to be less than the angle formed by two consecutive peripheral antennae.

For the purpose of illustration, the accompanying drawing gives by way of example, one embodiment of the present invention. This example is believed to be sufficient for a complete understanding of the invention by those skilled in the art.

Figure 2:
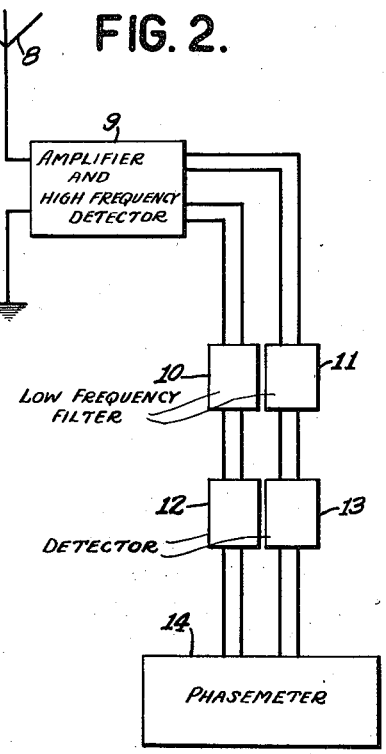
Figure 3:
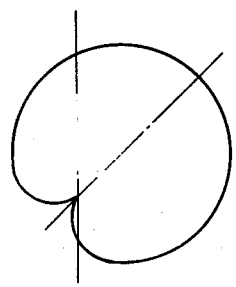
Figure 4:
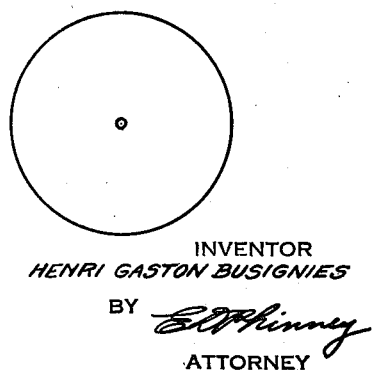

In this drawing:

Fig. 1 shows an antenna arrangement according to the invention, comprising a directional array and a non-directional array; Fig. 2 shows one embodiment of a receiving arrangement particularly adapted to be used in connection with the transmitting arrangement of Fig. 1; Fig. 3 represents a possible shape of directional diagram, and Fig. 4 represents a non-directional diagram which results from the non-directional antenna shown in Fig. 1.

The transmitting arrangement shown in Fig. 1, comprises a directional array which may be formed by vertical half-wave antenna 1, associated with reflecting elements such as 3, arranged in a circle about antenna 1 and rendered cyclically effective by distributor means 23. The rotary distributor 23 operates relays R to cyclically close reflectors 3 thus producing a rotary directive diagram. A non-directional array such as indicated at 4 may be positioned above the directional array 1—3.

The antenna 1 is fed by means of a transmission line 2 from a high frequency transmitter indicated by schematic block 6, said transmitter 6 transmitting a frequency $f_1$ modulated by a low frequency $F_1$.

The non-directional antenna 4 is fed by a transmission line 5 from a high frequency transmitter 7 transmitting a high frequency $f_2$ equal to $f_1$ plus or minus a small quantity and modulated by a lower frequency $F_2$, the products of said first modulation being remodulated by a third very low frequency $F_3$. The modulation circuits are not detailed as being known and easily provided by a man who is skilled in the art.

It will be understood that the representation of the directional and non-directional arrays and their relative positions are not to be considered as the only arrangement possible, but on the contrary may be modified at will according to particular conditions of design encountered.

The frequency $F_3$ is as previously explained, precisely related to the rotating speed of the directional diagram and depends upon the shape of said directional diagram. When said diagram is of cardioid shape as shown in Fig. 3 of the drawing, frequency $F_3$ is equal to the number of revolutions per second of said diagram. As aforesaid, if the directional diagram has the form of an eight with two symmetrical loops, frequency $F_3$ is double of the number of revolutions per second of the diagram. The phase of $F_3$ may be adjusted by a means 24 so as to vary the phase of the modulation signal with respect to the directive rotating diagram to shift the phase relationship to the received waves, as explained above.

The diagram of the non-directional antenna 4 is shown on Fig. 4.

The operation of the combined radio-beacon and non-directional transmitter as shown in Fig. 1 takes place according to the principles previously disclosed in the present specification Fig. 2 shows one possible receiving arrangement adapted to cooperate with a transmitting arrangement such as shown in Fig. 1 or with any suitable transmitting arrangement according to the invention.

In Fig. 2, an antenna or pick-up 8, which may comprise an ordinary aerial and/or a directive receiving element, is connected to an amplifier and high frequency detector device schematically indicated at 9, or any suitable known type. From said detector 9, two paths are provided comprising respectively low frequency filter 10 and detector 12 for frequency $F_1$ and low frequency filter 11 and detector 13 for frequency $F_2$. Both paths are connected to a phasemeter 14 adapted to measure the phase angle (lag) between currents from detectors 12 and 13. The angle of phase so measured gives instantaneously the angle of the direction of the station with any reference direction for example, the north line.

Although the invention has been described in detail in its application to a particular purpose, it will be appreciated that it may have other fields of use.

What is claimed is:

1. A radio beacon system comprising a directional emitter for emitting a first wave having a directional diagram, means for effecting rotation of said directional diagram to produce effective variation in amplitude of energy from said first wave at a fixed point in a predetermined direction, a non-directional emitter for emitting a second wave modulated at the frequency of the effective variation of said first wave, and means for adjusting the phase of said modulation frequency according to a predetermined plan with respect to the time relation of the passage of said directional diagram through a predetermined direction, whereby guiding indications from comparison of said first and second wave may be received only with knowledge of said predetermined plan.

2. A radio beacon according to claim 1, wherein said non-directional emitter is remote from said directional emitter.

3. A radio beacon according to claim 1, wherein the carrier frequencies of said first wave and said second wave are different, by an amount sufficient to avoid production of an audible beat note.

4. A radio beacon according to claim 1 in which said directional emitter comprises a vertical antenna and a plurality of other vertical antennae arranged in a circle around said first-mentioned antenna, and means for rendering said plurality of antennae cyclically effective to provide a rotating directive radiation diagram.

5. The method of signaling directional indications so as to inhibit unauthorized reception thereof which comprises producing a first wave, radiating said first wave in accordance with a rotating directional radiation diagram to produce an effective amplitude variation at a fixed point, producing a second wave, modulating said second wave with a frequency corresponding to said amplitude variation and in a phase having a given time relation to the passage of said rotating diagram through a given direction, radiating said second wave, and varying said given time relation according to an arbitrary plan whereby for deriving direction indications from said radiated waves a knowledge of said arbitrary plan is required.

HENRI GASTON BUSIGNIES.